P. T. LEAHY.
MILK CAN CLEANING AND SPRAYING DEVICE.
APPLICATION FILED JULY 15, 1918.
1,298,973.
Patented Apr. 1, 1919.
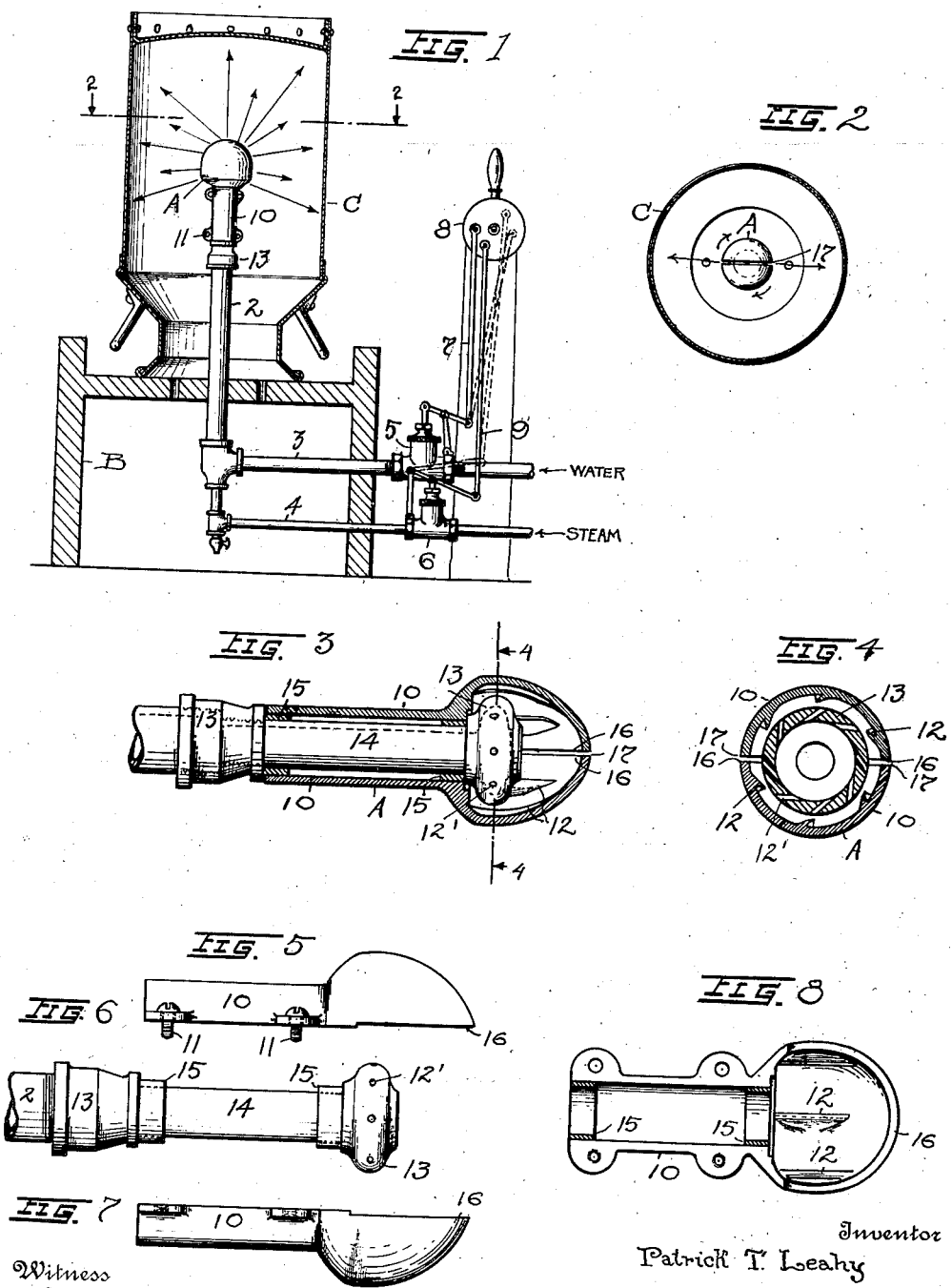
Inventor
Patrick T. Leahy

UNITED STATES PATENT OFFICE.

PATRICK T. LEAHY, OF BROOKLYN, OHIO.

MILK-CAN CLEANING AND SPRAYING DEVICE.

1,298,973.  Specification of Letters Patent.  Patented Apr. 1, 1919.

Application filed July 15, 1918. Serial No. 244,878.

*To all whom it may concern:*

Be it known that I, PATRICK T. LEAHY, a citizen of the United States, residing at Brooklyn, in the county of Cuyahoga and State of Ohio, have invented certain new and useful Improvements in Milk-Can Cleaning and Spraying Devices, of which the following is a specification.

This invention relates to a new and useful device for cleaning milk cans and similar receptacles, the primary object being to provide a simple apparatus for cleansing a milk can quickly and thoroughly through the discharge of cold water, hot water, and steam in a whirling spray at successive intervals into the can.

In the accompanying drawings, Figure 1 is a side view of my improved apparatus, showing a milk can supported in an inverted position thereover. Fig. 2 is a cross section of the can and a plan view of the spray nozzle, on line 2—2, Fig. 1. Fig. 3 is a side elevation and longitudinal section of the nozzle, while Fig. 4 is a transverse section thereof on line 4—4, Fig. 3. Figs. 5, 6 and 7 are side views of the nozzle parts separated, and Fig. 8 is an elevation showing the interior construction of one of the twin parts of the spraying nozzle.

The invention comprises a rotary spraying nozzle affixed to a stand-pipe 2 which is adapted to receive a supply of cold water from a branch pipe 3 and a supply of steam from a second pipe 4, or an admixture of water and steam from both supply pipes as may be determined by the valves 5 and 6 and the controlling mechanism therefor. Thus, valve 5 for the water pipe is pivotally connected by a link 7 with a rotatable disk 8 adapted to be manually operated, and valve 6 for the steam pipe is likewise connected with said disk by a link 9 but at a different radial point thereon. Assuming both valves to be closed, rotation of the disk 8 will first open valve 5 without opening valve 6, thereby permitting cold water to flow through the stand-pipe 2 and nozzle A directly into a milk can C when placed in inverted position upon a box B or other suitable support at the base of stand-pipe 2. An initial flow of cold water cleanses the can without coagulating the milk, and then by continuing the rotation of disk 8 after the link 9 has crossed a dead center, said link will move upwardly and open valve 6 and admit steam into the water in pipe 2, thereby heating the water before it is discharged through the nozzle into the can. Then upon continuing the rotation of the disk, the steam valve will be opened to its maximum by upward movement of link 9 and the water valve 5 will be closed by a similar movement of link 7, in this way subjecting the interior of the can to steam alone as a final step in cleansing operations.

The flowing water and steam are directed in a whirling sheet upwardly and laterally and with considerable force against the side and bottom surfaces of the inverted can, and the nozzle A is especially constructed to effect such result. Thus, the nozzle comprises a longitudinally-divided sleeve having a hollow enlargement or dome of round or oval shape at its end against which the water and steam is impacted at a tangent so as to revolve the sleeve. The two sleeve parts 10 are duplicates and are adapted to be fastened together by screws 11, and the interior wall of the round enlargement of each sleeve part is provided with a series of ribs 12 which form pockets to receive the jets of water discharged from the tangential openings 12' drilled at equidistant points in the side of the round head 13 of a hollow spindle 14 upon which the sleeve is rotatably mounted. This spindle is screw-engaged at its enlarged end 13 with the upper end of stand-pipe 2, and a pair of bands or collars 15 are clamped between the sleeve parts when they are screwed together upon the spindle, and the collars are free to turn on the spindle. The sleeve parts also fit closely at their longitudinal joint line, except where the stock is removed slightly at the opposing edges 16 in the dome portions thereof to provide a narrow mouth 17 extending diametrically across and down each side of the dome. The force of the fluid escaping through the jet openings causes the sleeve to revolve rapidly by impacting on tangential lines with the internal ribs in the dome, while at the same time the fluid is forced on diverging lines in a sheet through the mouth 17 into contact with the opposite sides and bottom of the can. Obviously, the cleansing effect is both complete and effective.

What I claim is:

1. A medium for cleansing milk cans and the like, comprising a tubular spindle having a head with tangential jet openings about its side, a sleeve rotatably mounted on said spindle having a cone shaped hollow end surrounding said head and apart therefrom and provided with a series of pockets on its inside in working relations with said jet openings and having a central discharge slot across its front and side.

2. A device for cleansing milk cans, comprising a hollow spindle having a tangentially perforated head, collars rotatably mounted upon said spindle, a sleeve removably clamped upon said collars and having a dome shaped end inclosing said head and having longitudinally disposed ribs on its inside and an elongated water outlet across its outer portion.

3. A can cleansing medium comprising a tubular spindle and a hollow head therefor having jet openings tangentially disposed in the sides thereof, in combination with a member having a tubular shank rotatably mounted upon said spindle and provided with a dome-shaped end over said head having internal ribs longitudinally forming pockets opposite said jet openings and slotted across its front and sides to discharge the water in a thin sheet.

Signed at Cleveland, in the county of Cuyahoga and State of Ohio, this 13th day of July, 1918.

PATRICK T. LEAHY.